(12) United States Patent
Kaiser et al.

(10) Patent No.: US 6,226,695 B1
(45) Date of Patent: *May 1, 2001

(54) INFORMATION HANDLING SYSTEM INCLUDING NON-DISRUPTIVE COMMAND AND DATA MOVEMENT BETWEEN STORAGE AND ONE OR MORE AUXILIARY PROCESSORS

(75) Inventors: John Michael Kaiser; Warren Edward Maule, both of Cedar Park; David Wayne Victor, Round Rock, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/537,187

(22) Filed: Sep. 29, 1995

(51) Int. Cl.[7] ...................................................... G06F 13/00
(52) U.S. Cl. .................................. 710/5; 710/24; 711/154
(58) Field of Search .................................... 395/825, 844, 395/800; 710/5, 24; 712/1, 34; 711/154

(56) References Cited

U.S. PATENT DOCUMENTS 4,409,656 * 10/1983 Andersen et al. ................ 395/200.2

(List continued on next page.)

FOREIGN PATENT DOCUMENTS 0 609 041 A1    1/1994   (EP) .

(List continued on next page.)

OTHER PUBLICATIONS

Intel, 1985; ; APX 86/88, 186/188 User's Manual Hardware Reference; pp. 4–1 to 4–6, 4–15 and 4–20 to 4–24.*

(List continued on next page.)

*Primary Examiner*—David L. Robertson
(74) *Attorney, Agent, or Firm*—George E. Clark; Leslie A. Van Leeuwen

(57) ABSTRACT

An information handling system which efficiently processes auxiliary functions such as graphics processing includes one or more processors, a high speed processor bus connecting the one or more processors, a memory controller for controlling memory and for controlling the auxiliary function processing, a memory system, and an I/O bus having one or more I/O controllers with I/O devices connected thereto. The system further includes means in a processor for building a queue of command blocks related to the auxiliary function processor, writing one or more command blocks to memory, which may include a processor cache, writing a start address for each command block to an address FIFO associated with the auxiliary function processor, reading a command block queue start address by the auxiliary processor, recognizing the command block read, issuing a coherent read for queued command blocks with intervention enabled, flushing a copy of the queued command block from processor cache to memory subsystem if a copy of the queued command block is in processor cache, intercepting the flushed copy of the queued command block from cache to memory and canceling the read to memory, storing the queued block in a command buffer associated with the auxiliary function processor, processing the commands in the queue by the auxiliary function processor, and writing a complete status to a predetermined location which is periodically polled by a processor on completion of the auxiliary function processing. For each data request to or from storage from the auxiliary function processor, a determination is made as to whether the request is for a coherent or non-coherent read or write of the data. If the request is for a non-coherent read or write, the snoop cycle on the processor bus is inhibited and bypassed since there is no need to perform a snoop to maintain coherency for non-coherent data. That data request is then handled and processed.

10 Claims, 8 Drawing Sheets

U.S. PATENT DOCUMENTS 5,113,494 * 5/1992 Menendez et al. .................. 395/502

FOREIGN PATENT DOCUMENTS

| 0 645 715 A1 | 6/1994 | (EP) . |
| WO 83/01326 | 4/1994 | (WO) . |

OTHER PUBLICATIONS

IBM Technical Disclosure Bulletin, "Input/Output Control Block Indirect Device Control Parameter Mechanism", vol. 29, No. 8, Jan. 1987, pp. 3597–3598.

* cited by examiner

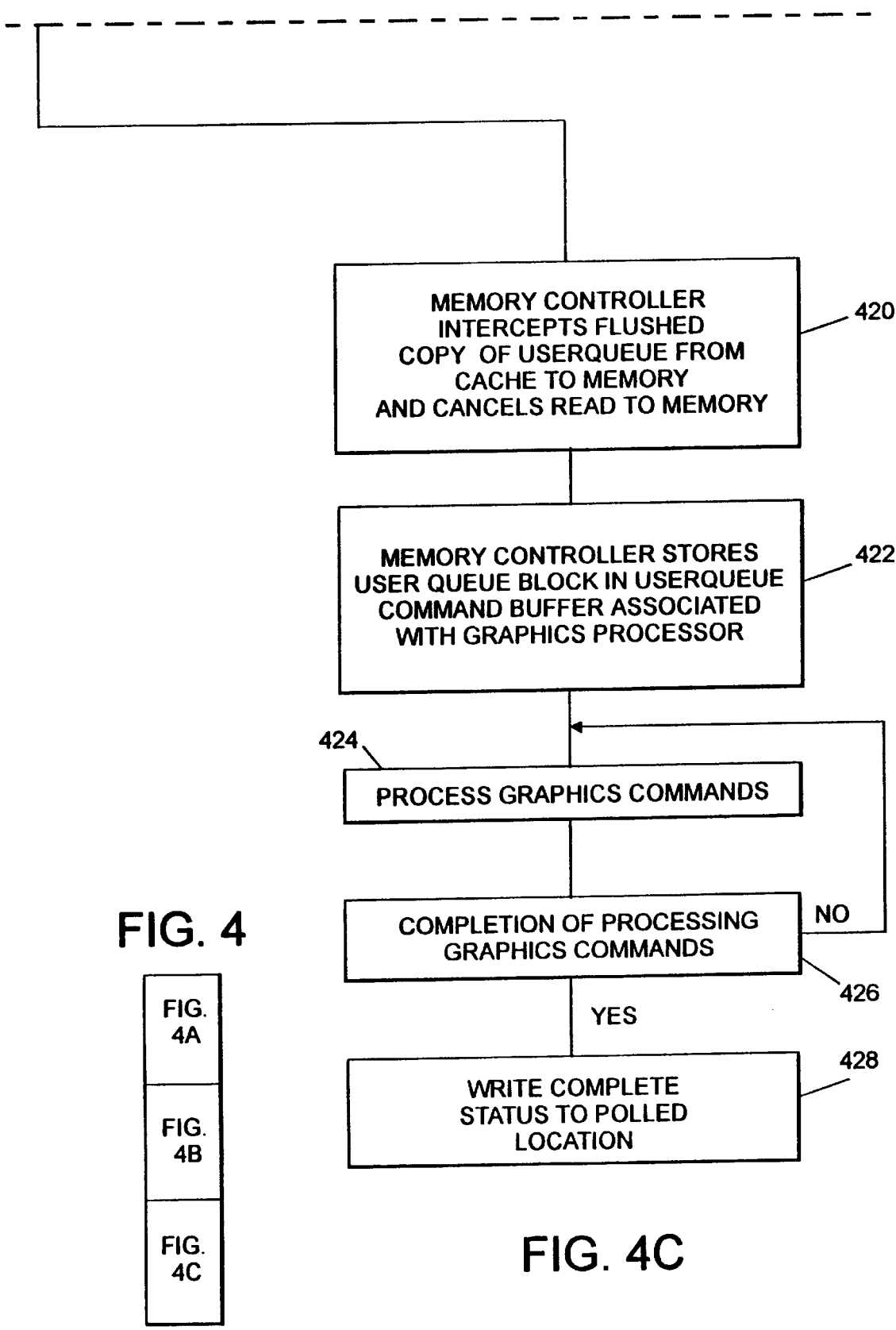

INFORMATION HANDLING SYSTEM INCLUDING NON-DISRUPTIVE COMMAND AND DATA MOVEMENT BETWEEN STORAGE AND ONE OR MORE AUXILIARY PROCESSORS

TECHNICAL FIELD

The present invention relates to information handling systems and, more particularly, to information handling systems including efficient means for moving data between storage and auxiliary processors without disrupting activity on a main processor bus.

BACKGROUND OF THE INVENTION

Field of the Invention

Most modern computer systems today use a concept of virtual memory wherein there is more memory available to the application programs than really exists in the machine (so-called real memory). This memory is called virtual because the operating system and hardware let the application think this memory is there, but in reality may not exist in physical memory accessible by the processor(s) but is allocated out on the system hard disk. The hardware and software translate virtual addresses by the program into addresses where the memory really is, either in real physical memory or somewhere out on the hard disk. It does this on a so-called page unit basis which is typically 4K bytes.

These translations are kept in the processor hardware in a translation lookaside buffer (TLB) because they are done constantly and need to be done rapidly. When a page is accessed by a processor and it is not in real memory, a page fault interrupt occurs and the software brings in the page from disk and maps it to a real page in memory. If there was no empty real memory space to put that page in from the disk, the software first selects a page to be copied to the disk freeing up space before replacing it with the page from the disk. This is called page swapping. In order to remove a real page from memory, the software changes the hardware translation buffers (TLBs) so that the old virtual addresses no longer map to their old real page location. This is called invalidating the TLB. If that virtual address is then referenced, the software will take a page fault and then know it is not in real memory and to look for it on the hard disk. When the new page is brought in from the disk, the TLB is then changed to map the new virtual address to that real page address in memory.

Today's computer systems also consist of one or more processors, each having a cache memory which contains a copy of recently used data from real memory to speed up execution. When a processor fetches or stores data to memory, the data is loaded or saved in its cache. A similar technique is used to save data back to memory when not recently used and to update a section of the cache with data currently being accessed by the processor(s). This is usually done entirely in hardware for speed.

When a processor is accessing cached data, it causes no external bus or memory activity and, therefore, is extremely efficient.

In these types of computer systems, several alternatives currently exist for moving data between memory (or a processor cache when data may be modified in a processor cache) and an I/O device. The first alternative is to have the processor issue loads and then stores directly to the devices using PIO (programmed I/O). The processor accesses memory (or cache) using a Load instruction into one of its internal registers. The hardware translates the virtual address using the TLB and gets the data from the real memory (cache) location. As noted above, a page fault will occur if the data is not presently in real memory, and the OS software will swap the data in and then the access will occur. Once the data is in the processor register, it is then written to the I/O device using a store to the I/O location. (The reverse procedure is used if the I/O device is the source of the data and the memory is the target.)

This method, although simple in programming terms, has the drawback of consuming any processor cycles since the processor is slowed by the speed of the I/O device, as well as consuming system bus and I/O bus bandwidth since there are no burst transfers available, and the transfers are limited to the processor operand sizes (words, double words, etc.). Transferring a 4K page of data in this manner would require a thousand such operations using the typical word size operand load and stores.

Another common alternative is to use Direct Memory Access (DMA) to transfer blocks of data from memory to I/O or vice versa. This has the advantage over the first alternative of saving many CPU cycles, using more efficient burst transfers and potentially not using the system bus bandwidth, if due to the system organization, the traffic can be kept off of the main system (processor/memory bus); however, there is still a large processor overhead involving the DMA setup, as will be explained below, and in handling the terminating interrupt, which again involves the OS kernel.

The DMA setup is complicated by the fact that when an application wishes to write or read some data from I/O from one of its virtual pages, the I/O DMA devices do not typically understand these virtual addresses and, second, where is the data, in memory or on the hard disk? As noted before, the OS software may have temporarily swapped an application's data page out to disk.

To set up a DMA transfer requires the processor to get the source (or target) memory address, translated from a virtual address to a real memory address, and then get the OS software to "pin" the real page in memory while the transfer is taking place. Both of these operations involve an OS kernel call which can be expensive in processor cycles. The "pinning" operation is for the real page manager to mark the real page unavailable to be paged out to disk and not be replaced by the OS software. If this were allowed, the I/O device could transfer data to an application other than the one requesting the transfer, with disastrous results.

For data intensive transfers such as graphics screen painting or multimedia device transfers, the CPU overhead or system bus bandwidth is the limiting factor.

Auxiliary processing functions such as graphics processing have generally been performed by relatively expensive graphics adapters or three dimensional pixel processing in prior art systems.

Recent prior art software developments have allowed graphics processing to be handled by the main processor complex in an information handling system. However, the result was not totally satisfactory since graphics pipeline processing does not adapt well to a normal CPU architecture.

Some newer systems have moved graphics processing functions into the memory controller to take advantage of the speed and bandwidth of the memory interface and to offload the processor as much as is practical.

SUMMARY OF THE INVENTION

Therefore, it is an object of the present invention to execute graphics processing functions in a graphics processor located in a controller attached to the processor bus including means for managing command blocks and data block movement requests in such a way as to minimize contention with normal processor or direct memory access traffic to a storage subsystem.

Accordingly, an information handling system which efficiently processes auxiliary functions such as graphics processing includes one or more processors, a high speed processor bus connecting the one or more processors, a memory controller for controlling memory and for controlling the auxiliary function processing, a memory subsystem, and an I/O bus having one or more I/O controllers with I/O devices connected thereto, further includes means in a processor for building a queue of command blocks related to the auxiliary function processor, writing one or more command blocks to memory, which may include a processor cache, writing a start address for each command block to an address FIFO associated with the auxiliary function processor, reading a command block queue start address by the auxiliary processor, recognizing the command block read, issuing a coherent read for queued data blocks with intervention enabled, flushing a copy of the queued data block from processor cache to memory subsystem if a copy of the queued data block is in processor cache, intercepting the flushed copy of the queued data block from cache to memory and canceling the read to memory, storing the queued block in a command buffer associated with the auxiliary function processor, processing the commands in the queue by the auxiliary function processor, and writing a complete status to a predetermined location which is periodically polled by a processor on completion of the auxiliary function processing.

For each data request to storage from the auxiliary function processor, a determination is made as to whether the request is for a coherent or non-coherent read or write of the data. If the request is for a non-coherent operation, the snoop cycle on the processor bus is inhibited and bypassed since there is no need to perform a snoop to maintain coherency for non-coherent data. That data request is then handled and processed.

It is an advantage of the present invention to issue all coherent reads to the processor bus with intervention enabled, to be snooped by the processor, flushed to memory if modified, and to capture the data by the auxiliary function processor and canceling the read to memory.

It is an advantage of the present invention that 3D graphics processing may be efficiently accomplished with minimum interference to processor bus traffic or to memory accesses.

It is another advantage of the present invention that the integration of a graphics pixel processing engine in a memory controller design provides a cost effective way of giving a system 3D graphics capability.

Other features and advantages of the present invention will become apparent in the following detailed description of the preferred embodiment of the invention taken in conjunction with the accompanying drawing.

BRIEF DESCRIPTION OF THE DRAWING

FIG. 4, which includes FIGS. 4A, 4B, and 4C, is a flow chart showing in greater detail the processing of graphics commands and data in accordance with the present invention.

DETAILED DESCRIPTION OF A PREFERRED EMBODIMENT OF THE INVENTION

A Processor builds USERQUEUE command blocks and writes them into its internal cache. It then writes the starting address of the command block to the USERQUEUE address FIFO in the memory controller. Since the command block may not have been flushed back to main memory before the onboard graphics engine needs to read it, the memory controller differentiates command block requests from normal data requests by providing a cache intervention path for command requests. The memory controller issues a coherent read request for the USERQUEUE block with intervention enabled. When the USERQUEUE read request is seen on the processor bus, the processor must flush its copy of the USERQUEUE back to memory. During this flush, the USERQUEUE is captured by the memory controller, and the read is cancelled to memory. This provides the USERQUEUE data to the graphics engine more quickly and relieves the memory bus of any extra read/write traffic so that it is free to service other processor or DMA read/write requests. Once the graphics engine has completed the USERQUEUE, it writes a location in the command block that the processor is polling to provide completion status for the operation.

Turning attention to data requests by the graphics engine, again the focus was on minimizing impact to processor or DMA traffic handled by the memory controller. Certain read or write requests generated by the graphics engine are to areas in memory containing pixel map information or matrixes that will only be accessed by the graphics engine and will never be modified. This nullifies the need for keeping these transactions coherent with any of the processors in the system. Normal memory read/writes handled by the memory controller generate a snoop cycle on the processor bus to maintain coherency. A special snoop bypass path in the memory controller allows suppression of the processor bus snoop cycle whenever one of these data block move requests is seen from the graphics engine. This again minimizes processor address bus traffic by the graphics engine, so it is free to serve other processor or DMA requests.

Figure 1:
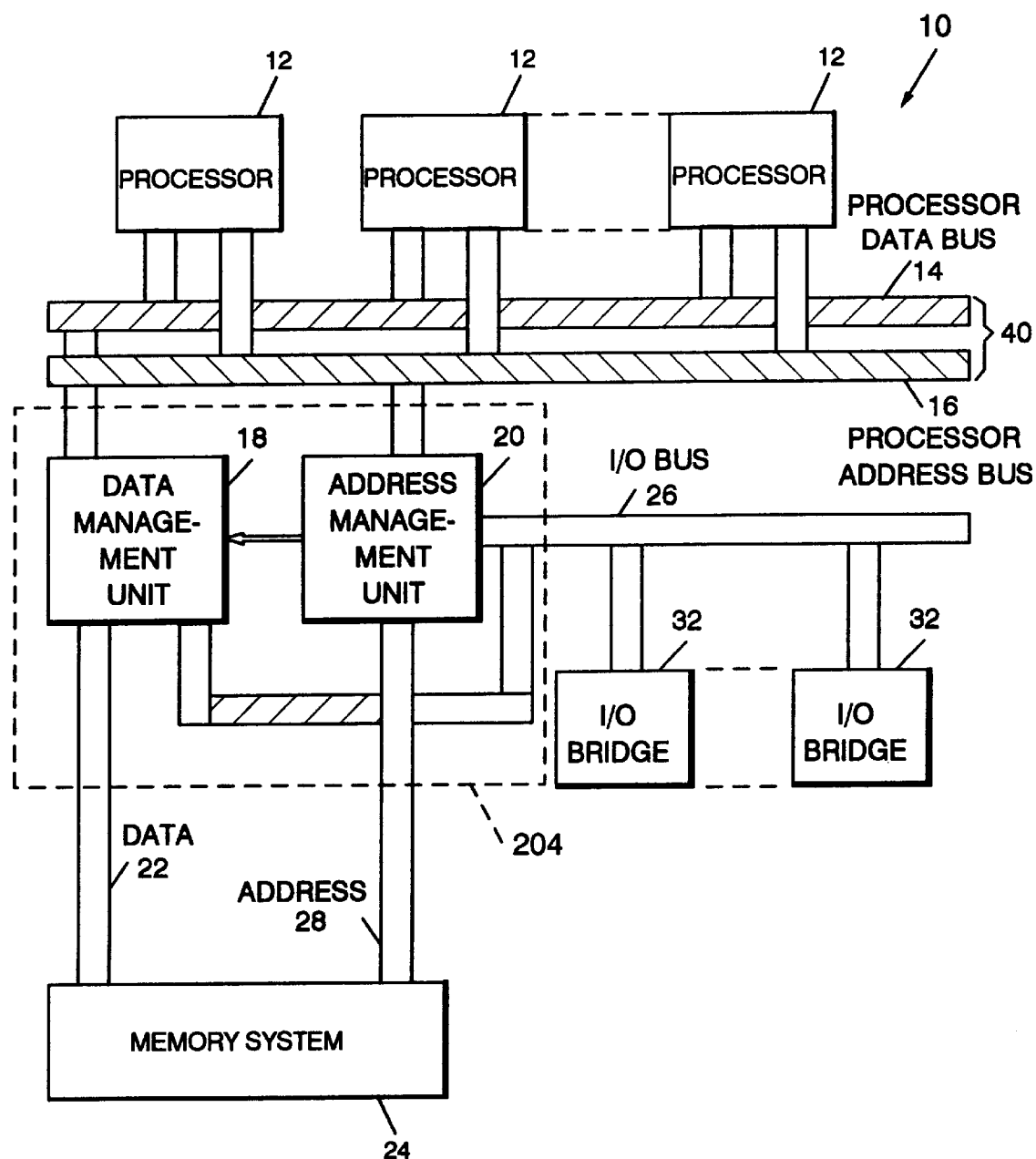
FIG. 1 is a block diagram of an information handling system in accordance with the present invention.

Referring now to FIG. 1, an information handling system implementing the present invention will be described.

An information handling system 10 includes one or more processing units 12, each having data outputs connected to a processor data bus 14 and having address outputs connected to a processor address bus 16. A data management unit (DMU) 18 is connected to processor data bus 14 and an address management unit (AMU) 20 is connected to processor address bus 16. BMU 18 and AMU 20 are components of memory controller 204 (see FIG. 2). Data management unit 18 is connected by memory data bus 22 to memory system 24 and by I/O bus 26 to I/O bridges 32. Address management unit 20 is connected by memory address bus 28 to memory system 24, and by I/O bus 26 to I/O bridges 32. DMU 18 and AMU 20 may be combined in a single unit as a bus isolation unit 204.

Each of the units identified above are well known in the art and will not be described in greater detail except for data management unit 18 and address management unit 20 which are described in greater detail in U.S. patent application Ser. No. 08/537,185 issued as U.S. Pat. No. 5,687,329.

Figure 2:
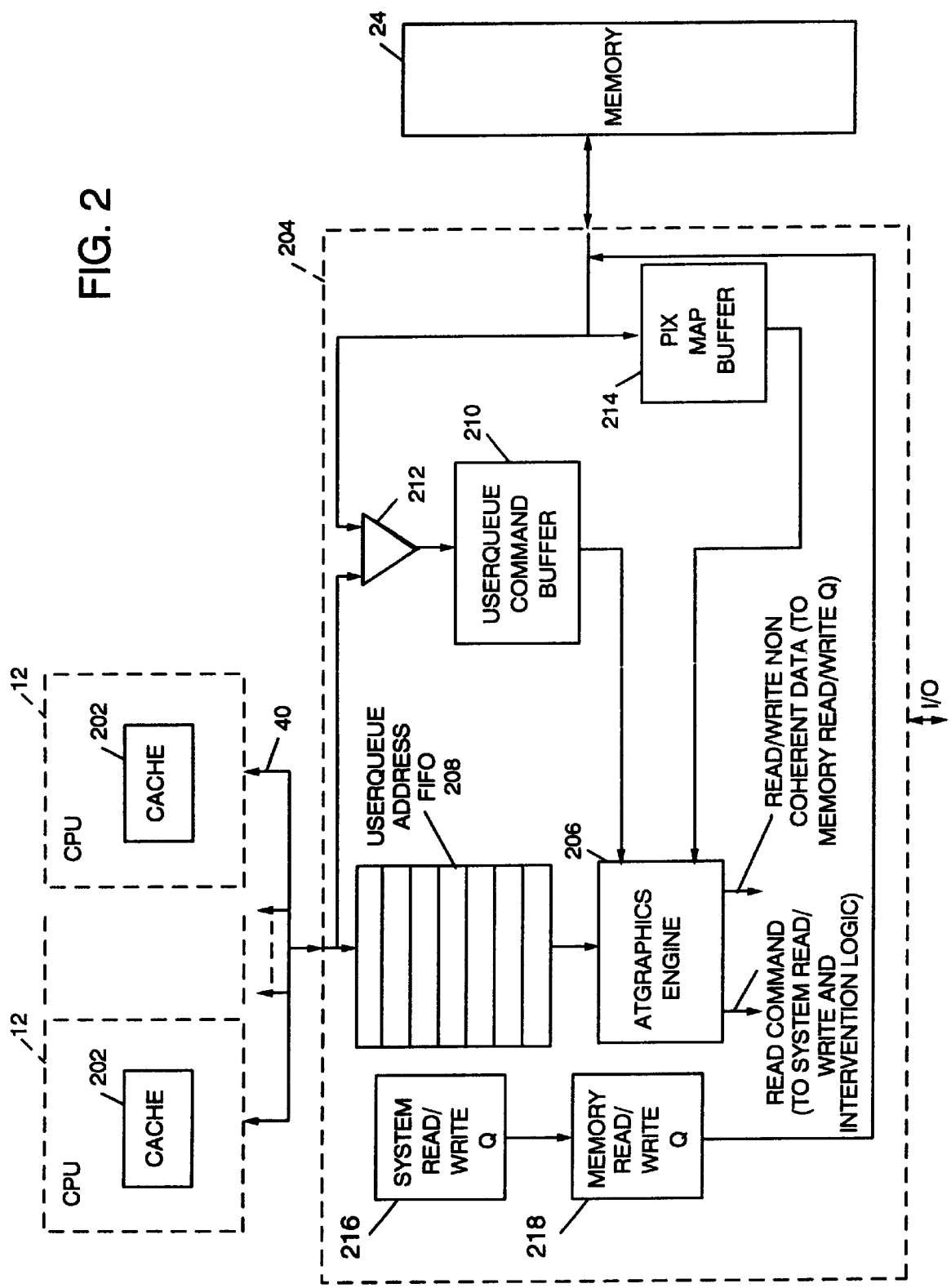
FIG. 2 is a block diagram showing in greater detail a memory controller including an auxiliary function processor and associated logic in accordance with the present invention.

Referring now to FIG. 2, elements of the present invention will be described in greater detail.

Each processor 12 attached to processor bus 14, 16 includes a cache 202. A memory controller 204 is also connected to processor SMP bus 40, which includes processor data bus 14, and processor address bus 16, for controlling access to memory system 24 either by processors 12 or by requests from I/O controllers 32. Memory controller 204 includes an auxiliary function processor 206 which may be a graphics processor. Memory controller 204 also includes a USERQUEUE address FIFO 208 for storing USERQUEUE starting addresses, a USERQUEUE command buffer 210 for storing commands for each USERQUEUE block, intervention logic 212 which is controlled by the nature of commands as being either coherent or non-coherent, and a pixel mapping buffer 214. The graphics engine 206 may generate coherent read commands which require intervention and snooping on the processor bus 14, 16 or non-coherent commands which disable the processor bus snooping logic.

Figure 3:
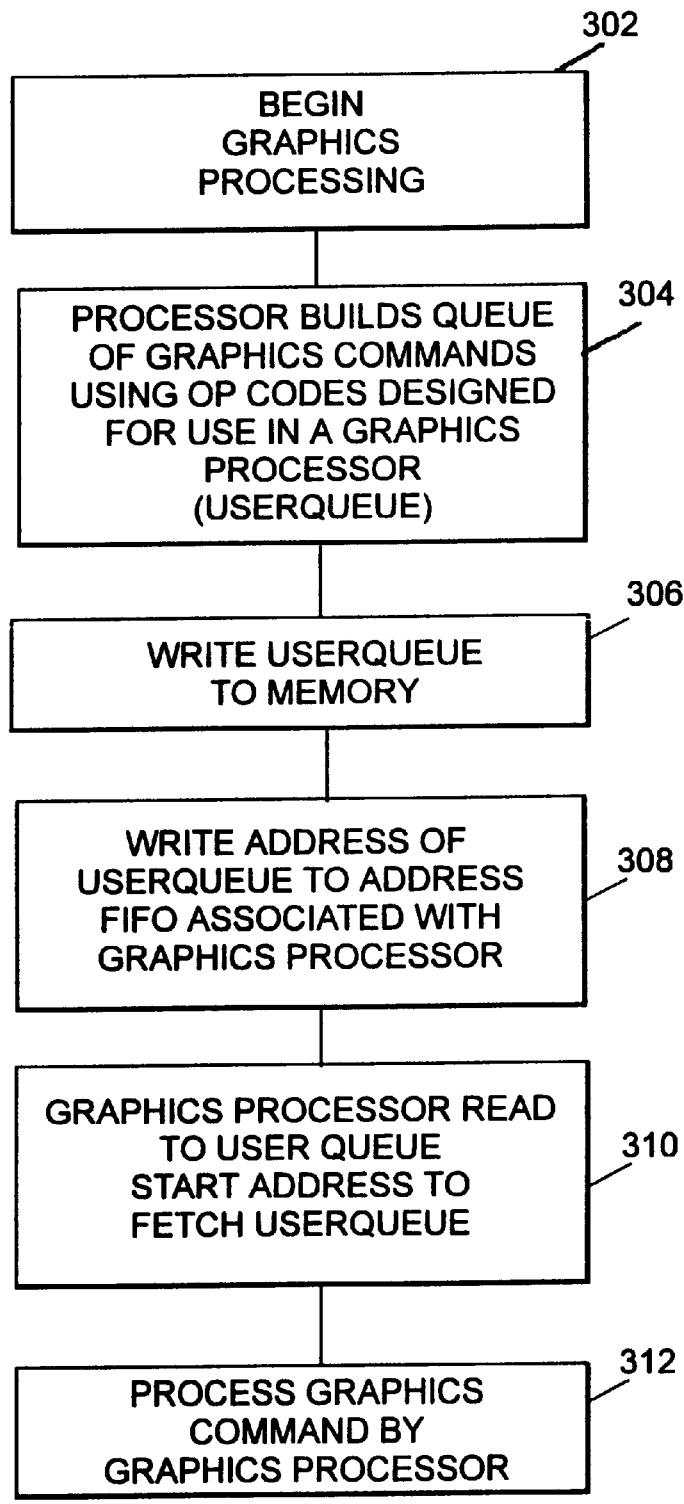
FIG. 3 is a flow chart showing a high level process for efficiently processing graphics data in accordance with the present invention.

Referring now to FIG. 3, an overview of graphics processing in accordance with the present invention will be described.

When graphics processing is begun 302, a processor 12 builds a queue of graphics commands using opcodes designed for use in a particular auxiliary function processor such as a graphics processor. This building of the command queue 304 generates a list which will be referred to herein as a USERQUEUE. The processor then writes 306 the USERQUEUE to memory and writes 308 the addresses of USERQUEUEs to address FIFO 208 associated with the graphics processor 206.

The USERQUEUE data will most likely remain in the processor cache 202 since that data is in a cachable memory location. The USERQUEUE address will be written directly to the address FIFO since it is located in a non-cachable memory location.

The write to the FIFO will trigger the graphics processor 206 to read 310 USERQUEUE start addresses to fetch the USERQUEUE. The graphics processor then processes 312 the graphics commands associated with the USERQUEUE.

Figure 4A:
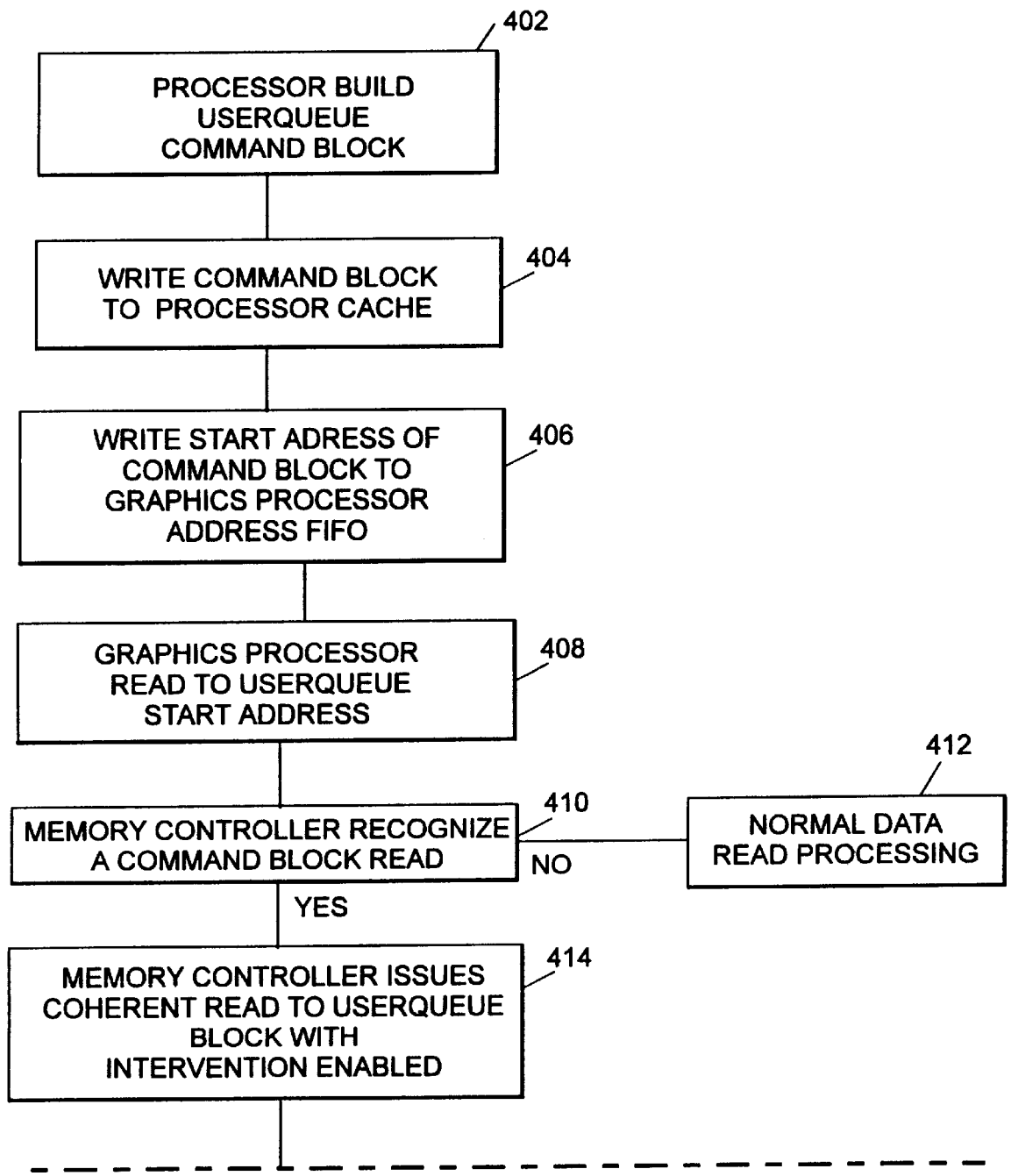
Figure 4B:
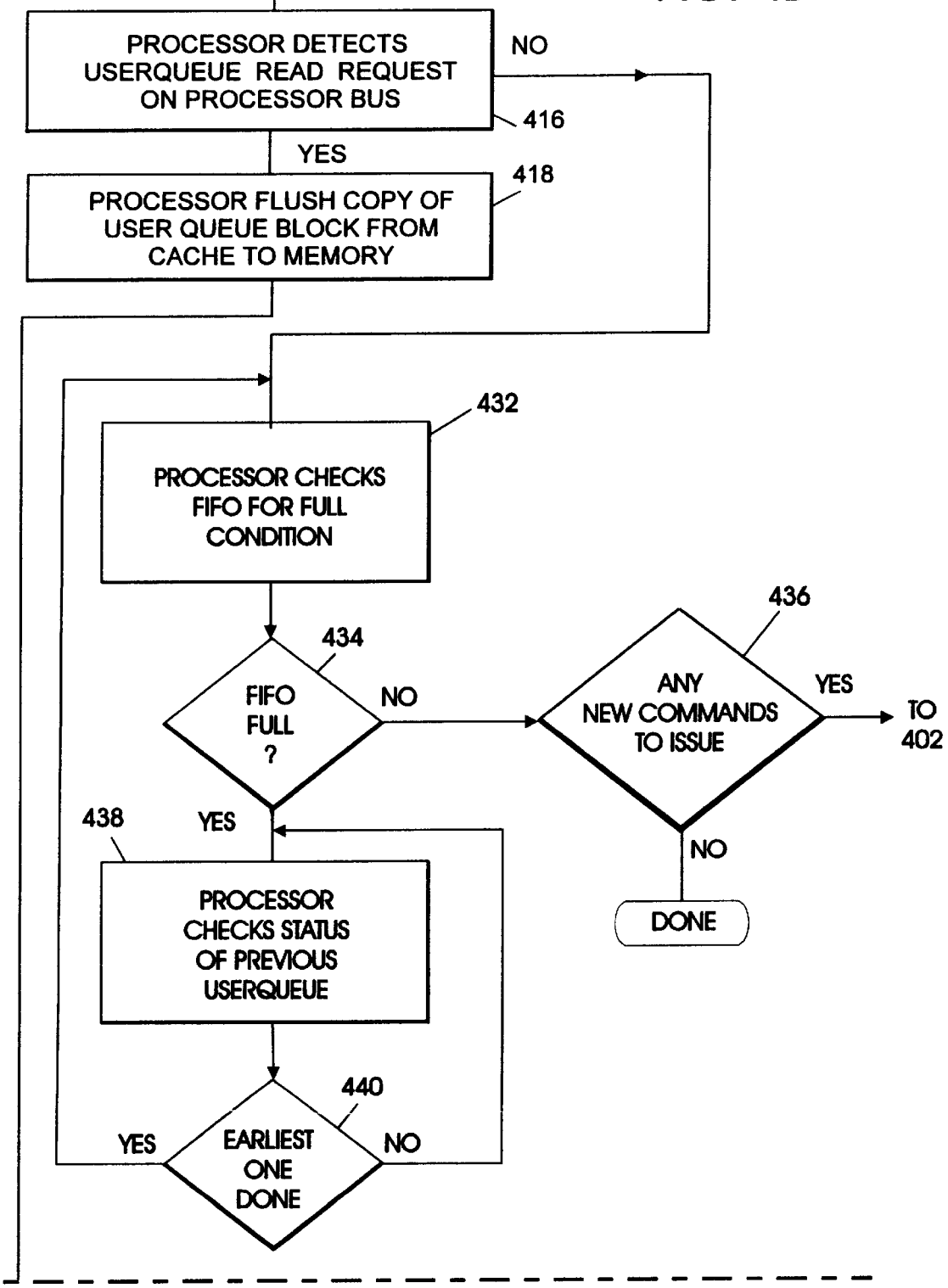

Referring now to FIG. 4, the present invention will be described with reference to a more detailed flow chart.

A processor builds 402 a USERQUEUE command block. The processor then writes 404 the command block to the processor cache.

The processor then writes 406 the start address of the command block to the address FIFO associated with the graphics processor, which triggers the graphics processor to read 408 the USERQUEUE start address. If the memory controller recognizes 410 a command block read (a coherent read), the memory controller issues 414 a coherent read to the USERQUEUE block with intervention enabled. If the memory controller does not recognize a command block read, normal read processing 412 is performed.

When the processor snoops a coherent (USERQUEUE) read request 416 on the processor bus, the processor flushes 418 a copy of the USERQUEUE block from the processor cache to memory. The memory controller then intercepts 420 the flushed copy of the USERQUEUE block from cache to memory and cancels the read to memory.

The memory controller then stores 422 the USERQUEUE block in the USERQUEUE command buffer 210 associated with graphics processor 206. The graphics commands in USERQUEUE command buffer 210 are then processed 424 by graphics engine 206. On completion of the processing 426 of graphics commands, a complete status is written 428 to a location periodically polled by the processor.

Figure 5:
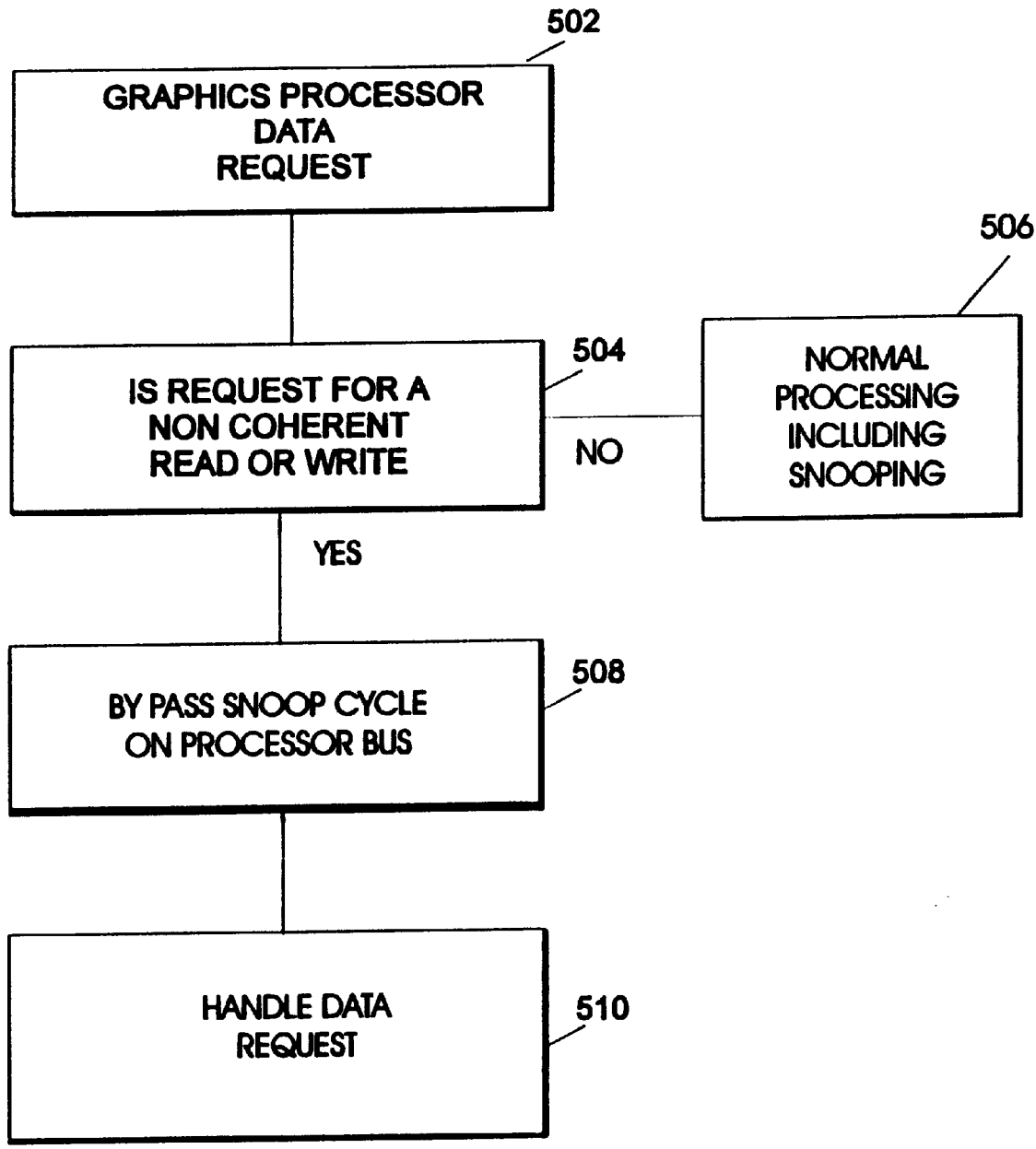
FIG. 5 is ia flow chart showing the processing of a graphics processor data request in accordance with the present invention.

Referring now to FIG. 5, the processing graphics commands step 424 of FIG. 4 will be described in greater detail.

When a graphics processor issues 502 a data request, memory controller 204 determines 504 if the request is for coherent read or write. If the request is for a coherent data operation, normal processing 506 including snooping on the processor bus is performed by issuing the read to system read/write queue 216.

If the request is for a non-coherent read or write, the snoop cycle on the processor bus is bypassed 508 and the data request is handled 510 by issuing the read/write to memory queue 218.

Figure 6:
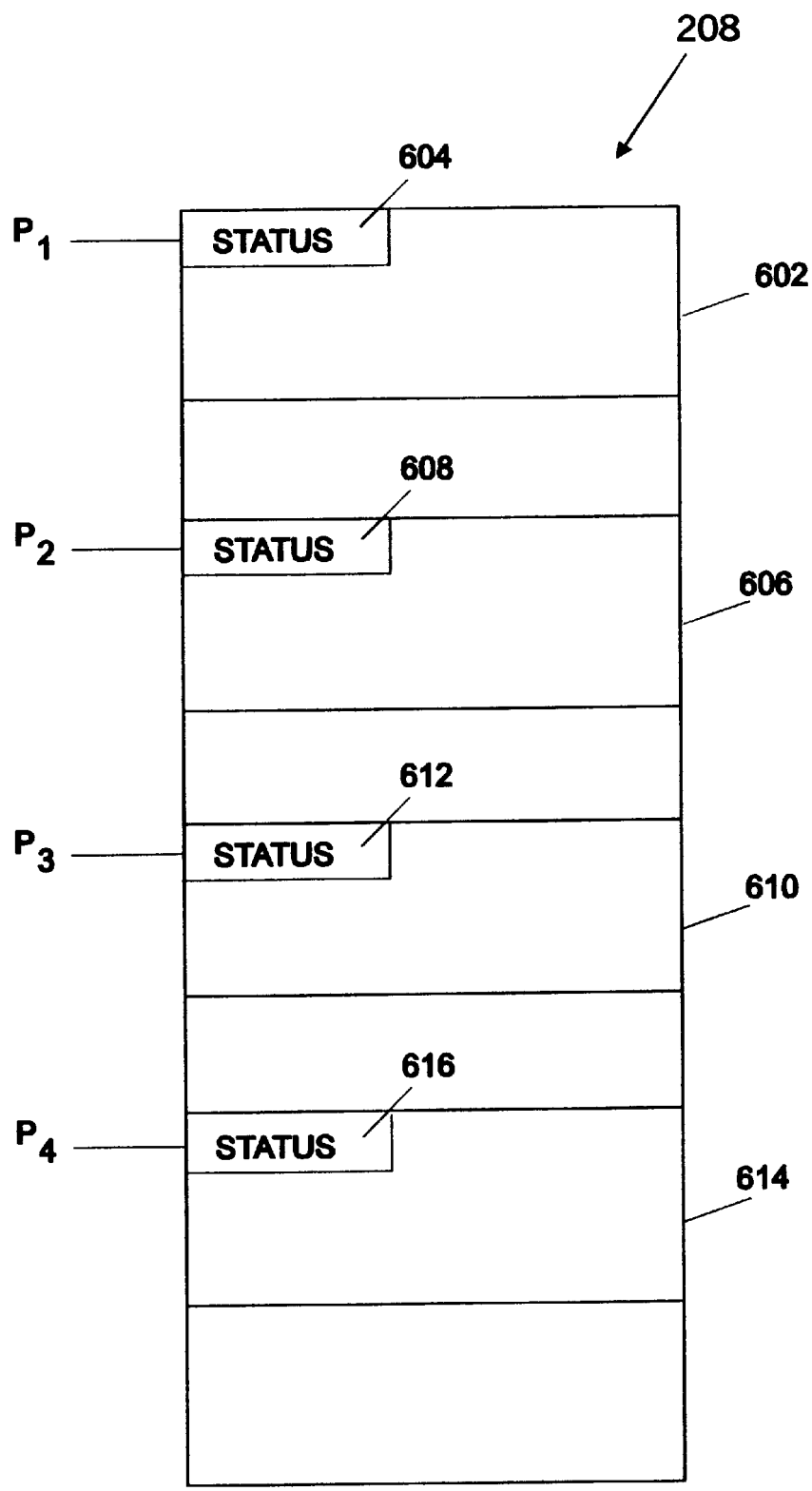
FIG. 6 is a schematic diagram showing a group of command blocks and a first in first out (FIFO) register for storing pointers to the command blocks in accordance with the present invention.

Referring now to FIG. 6, the USERQUEUE and USERQUEUE address FIFO 208 will be further described.

Each USERQUEUE 602, 606, 610, and 614, for example, is referenced by a pointer address P1, P2, P3, and P4, respectively. The pointers to USERQUEUEs 602, 606, 610, and 614 are stored in first-in first-out order in FIFO register 208.

After the completion of graphics processing as described above with respect to FIG. 4, the step of writing a complete status 428 includes writing the status into a location such as 604, 608, 612, and 616 in blocks 602, 606, 610, and 614, respectively, such that the processor when polling will examine the starting address location in each of the blocks to test for complete status.

Although the invention has been described with respect to a preferred embodiment which specifically deals with graphics processing where the graphics processing engine is embodied as a portion of a memory controller, it will be understood by those skilled in the art that the invention equally applies to other auxiliary function processors which require access to processors across the processor bus and to memory in a manner so as to minimize interference with other processor and memory accesses.

Accordingly, the scope of this invention is limited only by the following claims and their equivalents.

What is claimed is:

1. An information handling system, comprising:
   a processor, including a cache;
   a memory system;
   a memory controller for controlling said memory system, and including an auxiliary function processor;
   a processor bus, connecting said processor to said memory controller;
   a memory bus, connecting said memory controller to said memory system;
   means within said processor for building one or more command blocks, wherein each command block contains one or more commands to be executed by the auxiliary function processor;
   means for storing the command blocks in the cache;
   means for writing a starting address of each command block to an address FIFO associated with the auxiliary function processor;

means for reading the starting address of each command block by the auxiliary processor;

means for successively accessing each command block using its starting address, and then processing the commands in each command block by the auxiliary function processor;

means for recognizing a command block read by said memory controller;

means for issuing a coherent read for a select queued command block with intervention enabled;

means for flushing, by said processor, a copy of the select queued command block to said memory system if a copy of the select queued command block is in the cache; and means for intercepting, by said memory controller, the flushed copy of the select queued command block from cache to the memory system and then canceling a read to memory.

2. An information handling system according to claim 1, further comprising:

means for storing the select queued command block in a command buffer associated with the auxiliary function processor; and means for writing, by the auxiliary function processor, a complete status indicator, on completion of processing the select queued command block, to a predetermined location in the cache which is periodically polled by said processor.

3. An information handling system according to claim 1, further comprising:

means for determining, by said memory controller, whether a request for data is for a coherent or non-coherent read of the data.

4. An information handling system according to claim 3, further comprising:

means for inhibiting a snoop cycle on said processor bus if the request for data is for a non-coherent read.

5. An information handling system according to claim 1, wherein the auxiliary function processor is a graphics processor.

6. A method for processing commands in an information handling system, comprising:

building, by a processor, one or more command blocks, wherein each command block contains one or more commands to be executed by an auxiliary function processor;

storing the command blocks in a cache associated with the processor;

writing a starting address of each command block to an address FIFO associated with the auxiliary function processor;

reading, by the auxiliary function processor, the starting address of each command block;

successively accessing, by the auxiliary function processor, each command block using its starting address, and then processing the commands in each command block;

recognizing, by a memory controller, a command block read;

issuing a coherent read for a select queued command block with intervention enabled;

flushing, by the processor, a copy of the select queued command block to a memory system if a copy of the select queued command block is in the cache; and intercepting, by the memory controller, the flushed copy of the select queued command block from cache to the memory system and then canceling a read to memory.

7. A method for processing commands according to claim 6, further comprising:

storing the select queued command block in a command butter associated with the auxiliary function processor; and writing, by the auxiliary function processor, a complete status indicator, on completion of processing the select queued command block, to a predetermined location in the cache which is periodically polled by the processor.

8. A method for processing commands according to claim 6, further comprising:

determining, by a memory controller, whether a request for data is for a coherent or non-coherent read of the data.

9. A method for processing commands according to claim 8, further comprising:

in response to said determining, inhibiting a snoop cycle on a processor bus if the request for data is for a non-coherent read.

10. A method for processing commands according to claim 6, wherein the auxiliary function processor is a graphics processor.

* * * * *